Feb. 13, 1968  R. C. WEILER  3,368,785
CAMPER HOLD DOWN BRACKET
Filed Jan. 10, 1966
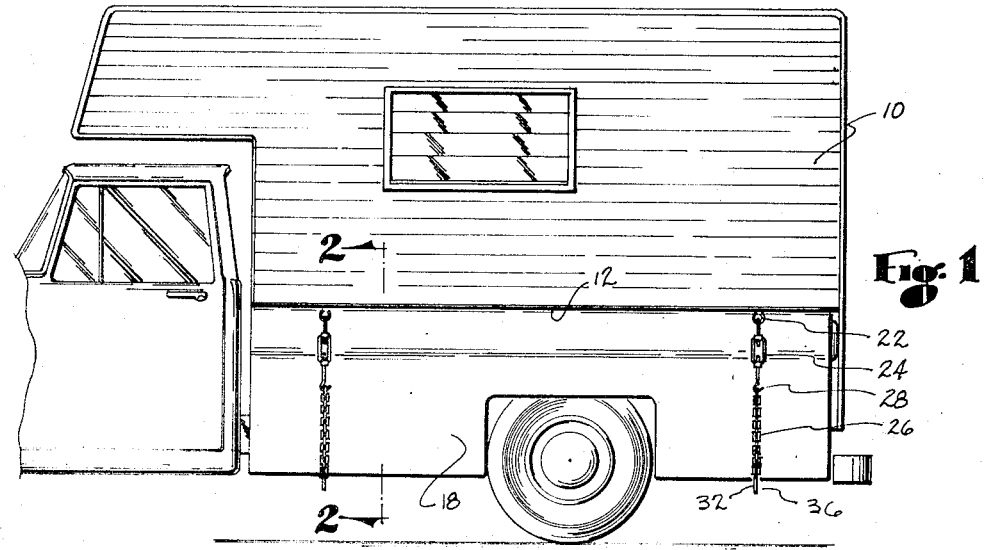
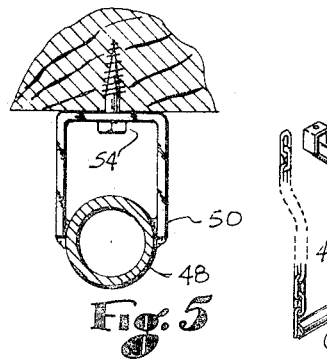
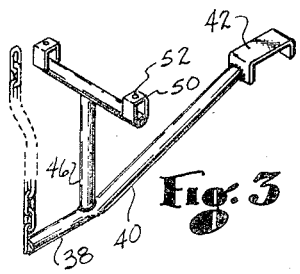
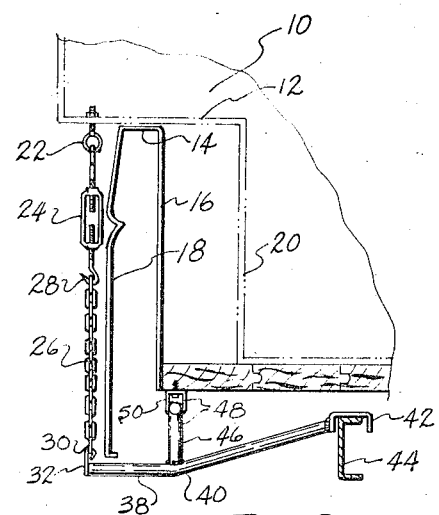
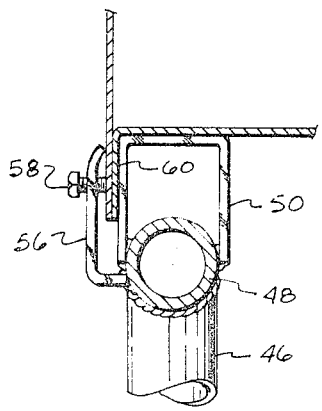
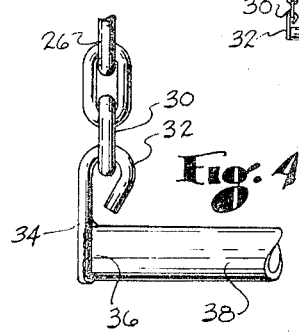
INVENTOR.
RAYWOOD C. WEILER
BY LIONEL V. TEFFT
ATTORNEY

# United States Patent Office 3,368,785
Patented Feb. 13, 1968

3,368,785
CAMPER HOLD DOWN BRACKET
Raywood C. Weiler, 17586 Vine St.,
Fontana, Calif. 92335
Filed Jan. 10, 1966, Ser. No. 519,665
6 Claims. (Cl. 248—361)

ABSTRACT OF THE DISCLOSURE

A tie down apparatus having a bar attachable to the frame of a truck, a fulcrumed connection with the truck bed and a releaseable chain connection with a camper on the truck.

---

This invention relates to hold down devices for securing the modern camper on a truck bed.

One of the objects of the invention is to provide releasable chain or cable and bracket mechanism for securing the camper to the truck frame and bed.

Another object of the invention is in the provision of quick detachable devices on either side of the vehicle for positive securement of the camper to the truck.

Still another object of the invention is to provide a camper hold down that is bracketed to the frame, fulcrumed against the truck bed and detachably chain connected to the camper.

Yet another object of the invention is in the provision of a camper hold down bracket that does not deface the truck body in any way.

Campers are usually secured to a truck body by a releasable connection between the camper and the exterior of the truck body. This not only results in defacement of the truck body but is not an absolute securing means for the heavy camper in transit. The theory of the present invention is to connect the camper to the truck frame and bed to prevent any possibility of dislodgement.

The detachable hold down apparatus may be quickly and easily attached to safely secure the camper on the truck under any condition of travel.

These and other objects and advantages of the present invention will become apparent to those skilled in the art upon consideration of the following detailed description of the preferred embodiment thereof, reference being made to the accompanying drawings, herewith, wherein:

FIGURE 1 is an elevational view showing the hold down brackets in operative position;

FIGURE 2 is a sectional view taken on the line 2—2 of FIGURE 1;

FIGURE 3 is a perspective view of the complete hold down bracket;

FIGURE 4 is an enlarged partial view of the chain and bracket bar connection;

FIGURE 5 is an enlarged partial view showing a screw connection between the bracket fulcrum and wood truck bed; and FIGURE 6 is an enlarged partial view showing a method of connecting the bracket fulcrum to a metal truck bed.

It is well known that modern campers are adapted to rest on the truck bed and upstanding side body portions of the truck as shown in FIGURES 1 and 2. A camper 10 has horizontal side portions 12 that rest on the flat upper body side 14 which connect the vertical side 16 to the extended fender parts 18. A vertical side 20 of the camper bottom rests on the bed of the truck as shown in FIGURE 2. Campers are heavy and any dislodgement in transit is dangerous. Campers are lifted to and from the truck body. Detachable connecting means have been used but applicant provides an entirely new and novel securing mechanism.

Eye bolts or hooks 22 and turn buckles 24 are usually standard equipment on campers. There is a conventional connection with the truck body or fender portion 18 that defaces the truck body and is not an absolute securing means. Applicant utilizes these standard parts as a connecting means for his special bracket.

This newly designed hold down device includes a chain or cable 26 that detachably engages the hook end 28 of the turn buckle 24. The lower end or last link 30 thereof is also detachably or otherwise connected to an upstanding hook 32 welded at 34 to the outer end 36 of a bracket arm 38. The arm 38 extends horizontally a short distance and then slopes upwardly at 40 ending in a down turned bracket 42 that slips over the truck frame 44. A post or fulcrum 46 rises from the bracket arm and has a horizontal seat 48 welded thereto. This seat 48 may rest against the bottom of the truck bed but it is advisable to have a pair of stools 50 which are apertured at 52 for screws 54 for engagement with the under side of the truck bed if it is wood. This permanently secures the bracket to the truck frame and body. On the chain needs to be released for camper lift off.

Many truck beds are metal as shown in FIG. 6 and in this case upstanding fingers 56 are welded alongside the stools 50 and a screw or otherwise connection 58 engages the depending metal bed and side portions 60 and secures the bracket arm permanently the same as the screw connection. There may be two or four camper connections as defined.

The operation of a hold down bracket is relatively simple. Permanent connection of the bracket arm to the truck bed is desirable for two reasons. They are always in position for easy chain attachment and there is no possibility of the fouling of the wheels should the chain become released for some reason. It is apparent that all the operator has to do is connect the detachable chain with a bracket bar and the turn buckle and tighten the chain. With the bracket on the frame and a post fulcrum against the truck bed, a positive connection is made to secure the camper. The body of the truck is not defaced. In case the camper bed does not fit the truck body exactly, blocks may be used to prevent laternal shift. Also the brackets will fit on the frame between the truck bed blocks.

While I have described in considerable detail what I believe to be the present form of my invention, it will be understood by those skilled in the art that various changes may be made in the shape and arrangement of several parts without departing from the scope as is defined in the following claims.

I claim:
1. A hold down device for securing a camper to a truck bed and frame, comprising:
   A bar having at its inner end a connection with the truck frame;
   an upright on the bar adapted to be fulcrumed against the underside of the truck bed; and
   a releasable chain or cable connection therefor at the outer end of the bar and connectable to the camper.
2. A device as set forth in claim 1 in which the connection with the frame is detachable.
3. A device as set forth in claim 2 in which said upright is fashioned to stabilize the bar against lateral movement.

4. A device as set forth in claim 3 in which the outer end of said bar extends beyond the sides of the truck and has a direct releasable connection with the camper.

5. A device as set forth in claim 3 in which the stabilizing means comprises a horizontal seat and spaced bed engaging stools.

6. A device as set forth in claim 3 in which said upright is connected to the bed and a tensioning means is provided in the chain or cable connection with the camper.

References Cited

UNITED STATES PATENTS

| 2,830,783 | 4/1958 | Halvarson | 248—361 |
| 2,895,705 | 7/1959 | Maham | 248—361 |
| 2,904,303 | 9/1959 | Gentiline | 248—361 |

ROY D. FRAZIER, *Primary Examiner.*

FRANK DOMOTOR, *Assistant Examiner.*